June 17, 1924.

J. F. PARKER

VALVE

Filed Oct. 27, 1920

1,498,399

Joseph F. Parker INVENTOR.
by John Strehli
ATTORNEY.

Patented June 17, 1924.

1,498,399

UNITED STATES PATENT OFFICE.

JOSEPH F. PARKER, OF CINCINNATI, OHIO; JOHN ROBERT BURGAMY ADMINISTRATOR OF SAID JOSEPH F. PARKER, DECEASED.

VALVE.

Application filed October 27, 1920. Serial No. 420,023.

*To all whom it may concern:*

Be it known that I, JOSEPH F. PARKER, a citizen of the United States, residing at the city of Cincinnati, in the county of Hamilton and State of Ohio, have invented certain new and useful Improvements in Valves, of which the following is a specification.

My invention belongs more particularly to relief valves or vents for radiators.

It relates to an improved air vent for steam heating apparatus, adapted for application to radiators or pipes, so that the cold air in said radiators or pipes is permitted to automatically pass out therefrom, and after the cold air has passed out, and steam has passed into the pipes or radiators, to seal said radiators or pipes against the escape of steam. The device works automatically; consequently, as soon as steam is let into the pipes, the cold air is forced ahead of it and is driven out through my relief valve, which is open at all times, and when the steam fills the pipes, the pressure therefrom automatically seals the valves against the escape of steam or hot air; when the steam falls, and the pipes become cold, the valve automatically opens and is thus again ready to automatically allow cold air to escape.

In connection with my valve, in order to insure its absolute operation in connection with any steam heating system, in which a certain amount of condensation or water may be present, when the steam is turned on and pressure exerted within the pipes, I provide a dome-shaped cap at the top of said valve, so arranged that the water will spurt up against the dome of said cap and be precipitated downwardly and pass off; said cap also provided with a multiplicity of small holes, through which the air can at all times pass out.

In the accompanying drawing, forming part of this specification;

Figure 1:
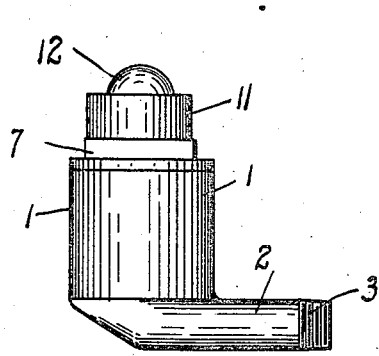
Fig. 1, is a side view of the valve, in elevation.

The valve casing is made up of a cylindrical part 1, and a stem or short pipe 2, made integral therewith, and carrying a screw thread 3 at its extremity, the body 1 carrying at its upper extremity an interior screw thread 4. This casing or body 1 may be of any shape or contour, and the pipe 2 may be made separately, if desired. A passageway or duct 5 passes through the pipe 2, and extends up to and communicates with the valve chamber 6. Onto the body part or casing 1, at its top, I screw a cylindrical fitting 7, by means of screw threads 8 on the same, screwing into the threads 4 on the body part 1, see Fig. 4. This fitting 7 may be of any form, but is preferably made as shown, a duct or opening $7^1$, the edge around the same forming a valve seat. At the top, the fitting 7 is ring-like in form, as shown at 10 in Fig. 4. Onto this ring 10 of the fitting 7, I tightly place a cap 11, having a dome 12 and around its upper outer edge provided with a multiplicity of small holes $12^1$. It will be seen that a large chamber 13 is present between the casing 7 and the dome of the cap 11, see particularly Fig. 4. The cap 11 may be of any desired configuration, but the form herein shown is preferred.

In the valve casing or valve chamber 6, I place a guide stem or post $13^1$, rigidly connected to the bottom of the chamber; this stem guides and keeps the float and valve in alignment and supports the same.

The float valve which operates in the valve chamber 6 and in the opening or duct $7^1$, is formed of a hood or float body part 14, of a truncated cone shape, and on the inside is provided with a tube 15, which fits over and down onto the stem $13^1$. At the top of cone-shaped hood 14, I provide a truncated, cone-shaped valve, or valve point 16, having a flat top end 17, which seats on and off of the valve seat formed by duct $7^1$. This float valve is preferably made and formed as shown, but may be made of any other form found desirable.

Through means of the screw threads 3, the device is screwed onto the radiator or any other place or point desired for its use.

Figure 4:
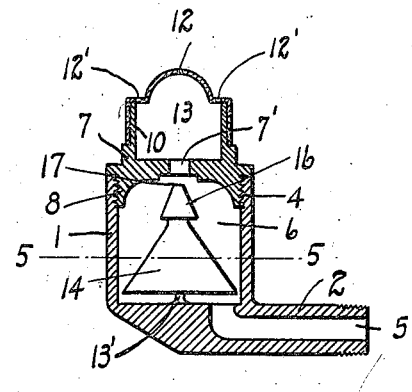
Fig. 4, is a longitudinal section, the interior construction shown in elevation.
Figure 2:
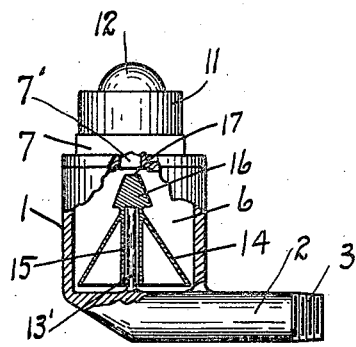
Fig. 2, is a similar view, partly broken away to illustrate interior construction, shown in section.
Figure 5:
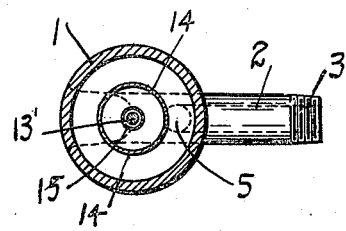
Fig. 5, is a sectional view, taken on the line 5—5 of Fig. 4, and Fig. 6, is an isometric view of the interior float valve.
Figure 3:
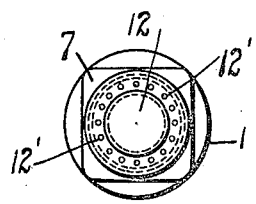
Fig. 3, is a top view.
Figure 6:
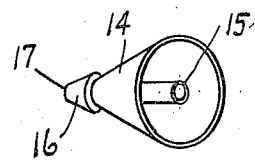

This relief valve is screwed onto the radiator or pipe of a heating system; when no steam is in the pipes, the hood 14 and the valve 16 are down, as shown in Figs. 2 and 4, allowing for the passage of the air out through the passageway or duct $7^1$, through chamber 13 and out through the small openings $12^1$ in the cap 11. When the steam is turned on and passes through the pipes from one radiator to the other, and from one floor to the other, the steam, exerting pressure against the cold air from the radiator or pipes, forces said cold air before it and it automatically passes out, as above set forth; but if any condensation or water is present in the pipes, it first reaches the relief valve, and in doing so passes up into the chamber 6, up through duct $7^1$ and strikes or spurts against the dome 12 of the cap 11, and is then precipitated downwardly into and through chamber 13 and down through duct $7^1$ into the chamber 6, from which it flows off; and when this condition is present, as soon as this water has fallen and run off, the air will automatically pass out, as above set forth. When the pressure of the steam becomes greater, as it passes up through the pipes, it forces the hood or float 14, and consequently the valve 16, upwardly in the chamber 6. The valve 16 passes up into the passageway or duct $7^1$, the flat top and the sides of said valve fitting into said duct $7^1$; thus sealing said passageway or duct $7^1$, rendering it impossible for the steam to escape. When the steam goes down, and the pressure subsides, the float and valve fall back into normal position; this action is repeated as the steam is turned on and off; the valve always acting automatically to allow the escape of the condensation and air, and also acting automatically to cut off the escape of steam.

It will be noted that by the use of this device, adjustment, manipulation and constant watching of the relief vents on pipes and radiators as now used is dispensed with; and by its automatic action, a full benefit of all the steam in the radiators and pipes is always realized.

Having thus described my invention, what I claim is:

1. An air vent for radiators and the like comprising a shell provided at its lower end with a hollow extension adapted to be connected to a radiator, a vertically disposed stem extending upwardly from the bottom of said shell, a cone-shaped float member guided by said stem and adapted to be raised by fluid pressure within the shell and to be lowered by gravity, a cone-shaped valve arranged at the upper end of said float, a cap for said shell provided with a vertically disposed outlet aperture adapted to be controlled by said valve, a chamber formed within the cap and arranged above the shell and adapted to receive air and moisture issuing from said outlet aperture, and a dome-shaped cover for said chamber having the apex of the dome arranged in alignment with the axis of said outlet aperture, said dome-shaped cover having an outwardly extending horizontally disposed flange arranged at the lower edge of the dome-shaped portion and provided with apertures adapted to permit air and moisture to escape from said chamber and to permit moisture flowing down said dome-shaped portion to flow into said chamber.

2. An air vent for radiators and the like comprising a shell having an open top and a closed bottom, a hollow extension integral with the bottom and adapted to be connected to a radiator, a passageway through said bottom and extension, the upper surface of said bottom being in a plane in order to permit moisture in the shell to freely drain into said passageway, a post extending upwardly from said bottom, a cone-shaped float member guided by said post and adapted to be raised by fluid pressure within the shell and to be lowered by gravity, a cone-shaped valve arranged at the upper end of said float, a cap detachably connected to the upper end of said shell and provided with a vertically disposed central outlet aperture adapted to be controlled by said valve, a chamber formed within the cap, arranged above the shell and adapted to receive air and moisture issuing from said outlet aperture, the lower surface of said chamber being shaped to permit any moisture deposited in the chamber to drain into the shell through said outlet aperture, and a dome-shaped cover for said chamber having the apex of the dome arranged in alignment with the axis of said outlet aperture, said dome-shaped cover having an outwardly extending horizontally disposed flange arranged at its lower edge and provided with apertures adapted to permit air and moisture to escape from said chamber and to permit moisture flowing down the exterior of the dome-shaped portion to flow into said chamber.

In testimony whereof, I affix my signature at Cincinnati, Ohio, this 16th day of October, 1920.

JOSEPH F. PARKER.